(12) United States Patent
Pryor et al.

(10) Patent No.: US 6,404,608 B1
(45) Date of Patent: Jun. 11, 2002

(54) OVERCURRENT PROTECTION DEVICE

(75) Inventors: Dennis Malcolm Pryor; Michael Challis; Ian Paul Atkins, all of Swindon (GB)

(73) Assignee: Tyco Electronics UK Ltd., Swindon (GB)

( * ) Notice: Subject to any disclaimer, the term of this patent is extended or adjusted under 35 U.S.C. 154(b) by 0 days.

(21) Appl. No.: 08/392,661

(22) Filed: Feb. 23, 1995

Related U.S. Application Data

(63) Continuation of application No. 08/030,393, filed on Apr. 8, 1993, now abandoned.

(30) Foreign Application Priority Data

| Oct. 12, 1990 | (GB) | 9022261 |
|---|---|---|
| Dec. 5, 1990 | (GB) | 9026518 |
| Dec. 13, 1990 | (GB) | 9027111 |
| Oct. 10, 1991 | (WO) | PCT/GB91/01761 |

(51) Int. Cl.$^7$ ................................................ H02H 3/00
(52) U.S. Cl. ........................................ 361/93.1; 361/93.4
(58) Field of Search .......................... 361/93, 93.1, 93.4

(56) References Cited

U.S. PATENT DOCUMENTS

| 3,801,872 A | 4/1974 | Zocholl et al. ............ 317/22 |
|---|---|---|
| 4,021,701 A | 5/1977 | Davies ...................... 361/18 |
| 4,202,023 A | 5/1980 | Sears ........................ 361/18 |
| 4,241,372 A | 12/1980 | Sears ........................ 361/72 |
| 4,423,457 A | 12/1983 | Brajder ..................... 361/86 |
| 4,438,473 A | 3/1984 | Cawley et al. ............ 361/18 |
| 4,477,747 A | * 10/1984 | Wakai et al. ........... 315/200 A |
| 4,513,343 A | 4/1985 | Ryczek ..................... 361/101 |
| 4,604,674 A | 8/1986 | Hamel ...................... 361/73 |
| 4,771,357 A | 9/1988 | Lorincz et al. ........... 361/87 |
| 4,809,122 A | 2/1989 | Fitzner .................... 361/18 |
| 4,937,697 A | 6/1990 | Edwards et al. ......... 361/18 |

FOREIGN PATENT DOCUMENTS

| AU | 48128/85 | 9/1985 | .......... H02H/3/087 |
|---|---|---|---|
| DE | 1 233 475 | 2/1967 | |
| DE | 24 31 167 | 1/1976 | ............ H02H/7/22 |
| DE | 2440947 A | 3/1976 | ............. G05F/1/58 |
| DE | 3433538 A | 3/1986 | ........... G05F/1/569 |
| DE | 37 25 390 | 9/1989 | ............ H02H/3/08 |
| GB | 1 467 055 | 3/1977 | ............ H02H/3/08 |
| GB | 1 481 458 | 7/1977 | .......... H03K/17/08 |
| JP | 57-129125 | 8/1982 | ............ H02H/3/46 |
| JP | 57-34725 | 2/1992 | ............ H02H/7/20 |
| TW | 107500 | 1/1989 | ............ H02H/3/00 |
| TW | 148095 | 12/1990 | ............ H02H/3/18 |
| WO | WO86/03079 | 5/1986 | .......... H03K/17/687 |

OTHER PUBLICATIONS

"Various Types of Power Supply Protection Circuits", *Switching Power supply Units,* Chapter 8, (p. 209–229).
"Using UC3840 in Designing a Switching Power Supply", *Collection of Transistor Circuit Manufacturing,* p. 150–161.
Switching Mode Power Supply, p. 52–62.
British Search Report, GB 9022261.3, Jan. 25, 1991.
British Search Report, GB 9027111.5, Mar. 26, 1991.

(List continued on next page.)

*Primary Examiner*—Michael J. Sherry

(57) ABSTRACT

An overcurrent protection arrangement comprises a switching circuit that is intended to be series connected in a line of the circuit to be protected and which will allow normal circuit currents to pass but will open when subjected to an overcurrent. The arrangement includes a pulse generator which will generate pulses when the switching circuit has opened that reset, or attempt to reset, the switching circuit to its conducting state. Only a predetermined finite number of pulses or pulses for a predetermined finite time are generated, so that the circuit will quickly function again after having been subjected to a current transient but will not continually attempt to reset in the case of equipment faults.

5 Claims, 3 Drawing Sheets

OTHER PUBLICATIONS

International Search Report, PCT/GB91/01761, Jan. 24, 1992.
Siemens–Bauteile Informationen/Horst von Pelka, vol. 4, #6, 1968, Munchen DE, p106–109.
Abstract of Japanese Publication No. 2–86210, Mar. 27, 1990, Toyota Automatic Loom Works Ltd., p. 85 E 940.
Abstract of Japanese Publication No. 63–146614, Jun. 18, 1988, Ricoh Company, Ltd., p. 55 E 675.
International Search Report for International Application No. PCT/GB91/02215, 04/14/92.
"Using UC3840 in Designing a Switching Power Supply", *Collectin of Transistor Circuit Manufacturing*, pp. 150–161.

* cited by examiner

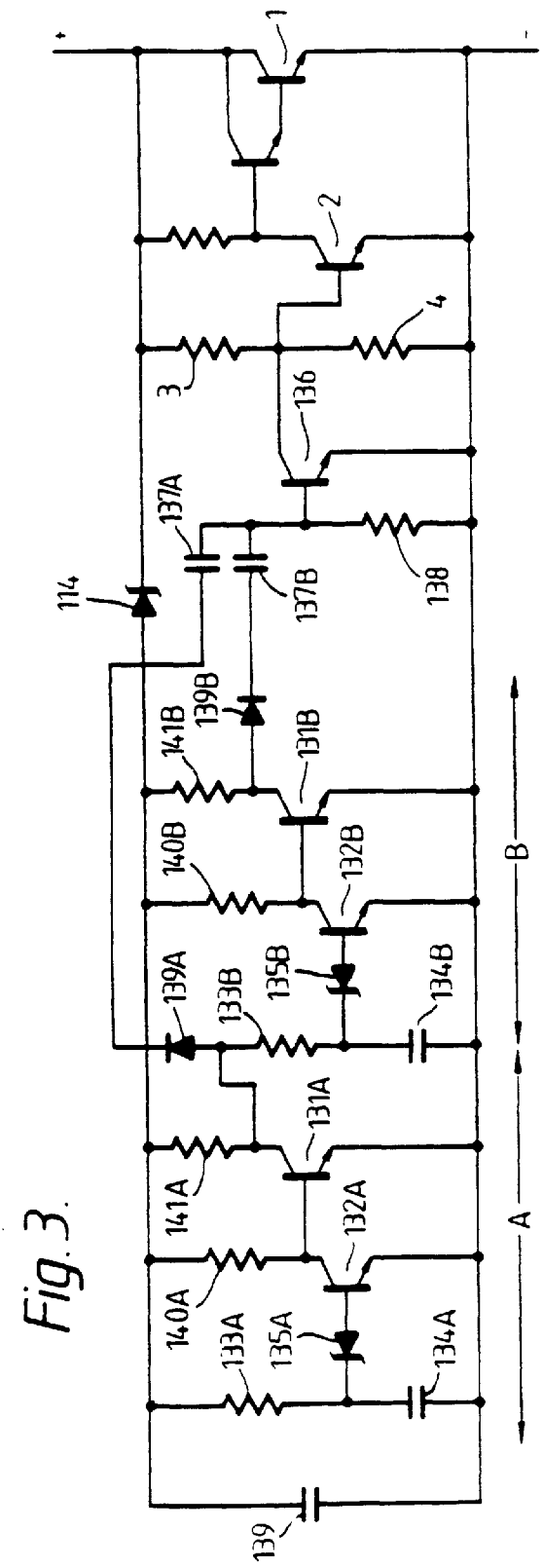
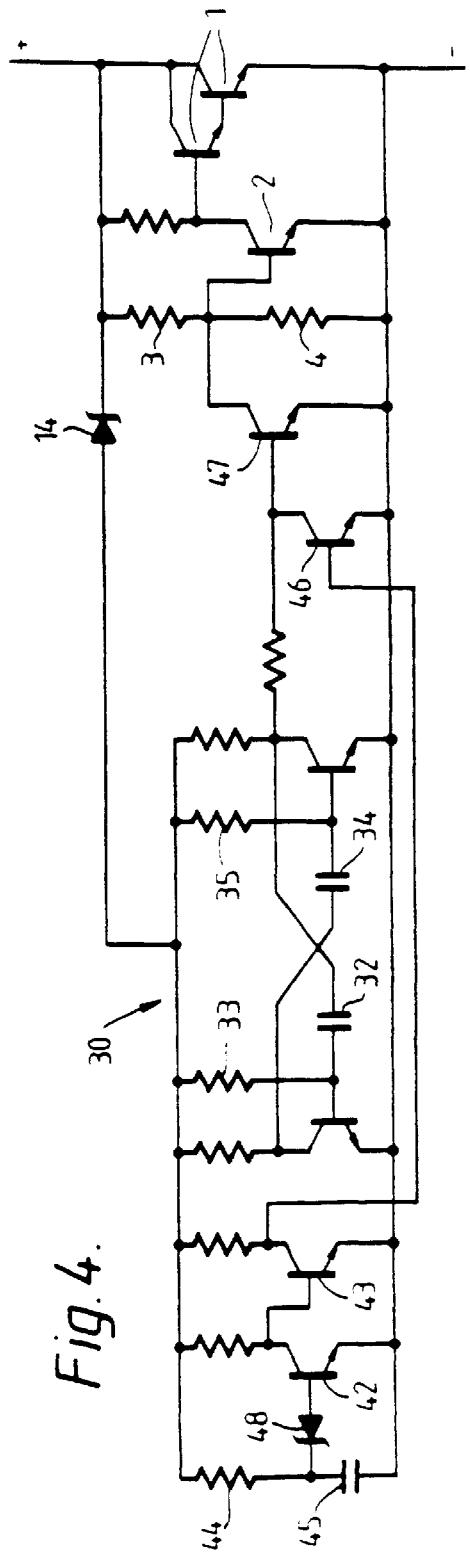
Fig. 3.
Fig. 4.

OVERCURRENT PROTECTION DEVICE

This application is a continuation of application Ser. No. 08/030,393, filed Apr. 8, 1993, the disclosure of which is incorporated herein by reference, and now abandoned.

BACKGROUND OF THE INVENTION

1. Field of the Invention

This invention relates to the protection of electrical circuits from overcurrents, for example from overcurrents caused by equipment faults or transient overcurrents caused by lightning, electrostatic discharge, equipment induced transients or other threats.

2. Introduction to the Invention

Many electrical circuits, for example telephone systems and other information distribution systems, are subjected both to transient overcurrents and to overcurrents of long duration for instance due to equipment failure or short circuits caused by damage to equipment. In such cases it would be desirable to incorporate in the system a device that would protect the system against both types of overcurrent but would automatically allow the system to continue functioning after a transient overcurrent has passed.

One such arrangement is described in Australian Patent Application No. 48128/85 to Glynn et al in which a pair of switching transistors in Darlington configuration is connected in series with a circuit line, the base of which is controlled by a silicon controlled rectifier (SCR) that senses the voltage drop across a resistor in series with the switching transistor. In addition, resetting circuitry is provided to reset or attempt to reset the switching arrangement periodically in the event that it trips. Another overcurrent protection circuit that will reset itself into normal operation after a transient overcurrent is described in U.S. Pat. No. 4,202,023 to Sears. However, both these circuits have a number of drawbacks. For example, the presence of a series resistor adds to the voltage drop across the device in use and will increase the difficulty and cost of manufacturing the arrangement in integrated circuit form because the resistor will have to carry load current in normal use. Also, both circuits will attempt to reset themselves indefinitely when the system is subject to a long-duration overcurrent such as caused by equipment failure with the result that it may be necessary to switch the system off before the fault can be repaired. Furthermore, in the case of the Glynn et al circuit, when the arrangement has tripped into its OFF state there will remain a relatively high leakage current through the SCR in the order of 10 to 20 mA.

SUMMARY OF THE INVENTION

Thus, according. to the invention there is provided an overcurrent protection arrangement, which comprises a switching circuit that is intended to be series connected in a line of the circuit to be protected and which will allow normal circuit currents to pass but will open when subjected to an overcurrent, the arrangement including a pulse generator which, when the switching circuit has opened, will generate pulses to a predetermined finite maximum number or for a predetermined time that reset, or attempt to reset, the switching circuit to its conducting state, the pulse generator and any other components of the arrangement taking their power supply from the voltage difference across the switching circuit, optionally after appropriate voltage regulation, for example by means of a Zener diode.

DETAILED DESCRIPTION OF THE INVENTION

The invention has the advantage that the number of pulses that is generated in order to reset or to attempt to reset the arrangement, or the time for which they are generated, is limited so that, for example, in the case of equipment failure the source is not continually switched into the faulty equipment. Thus, the protection can discriminate between transients and persistent system faults. In the case of an overcurrent the switching circuit will rapidly switch off and will then reset itself or attempt to reset itself one or more times in case the overcurrent is due to an externally induced transient. However, if the overcurrent persists, for example if it is caused by a fault in the load circuit, the switching circuit will immediately revert to its OFF state as soon as the resetting pulse ends. Once this has occurred for the predetermined number of pulses the arrangement will remain in its OFF state indefinitely.

The switching circuit preferably comprises a switching transistor that is intended to be series connected in the circuit line, and a control transistor that determines the base or gate voltage of the switching transistor, and whose base or gate voltage depends on the voltage drop across the switching circuit. For example, the control transistor may form one arm of a voltage divider which spans the switching transistor and which sets the base or gate bias of the switching transistor, the control transistor being connected in parallel with the base and emitter or gate and source of the switching transistor. The base or gate bias of the control transistor may also be determined by a voltage divider that spans the switching transistor. In normal operation of this form of switching circuit, when no current passes along the circuit line both the switching and the control transistor are off. As the voltage on the line increases the base or gate forward bias of the switching transistor rises due to the relatively high resistance of the control transistor in its off state, until the switching transistor turns on. In normal operation the arrangement will allow the circuit current to pass with a small voltage drop across the switching transistor of about 1.5 V in the case of an enhancement mode MOSFET or about 0.65 V in the case of a single bipolar junction transistor.

When the line is subjected to an overcurrent, the voltage drop across the switching transistor increases, hence the base or gate forward bias of the control transistor increases until the control transistor turns ON, thereby shorting the base and emitter or the gate and source of the switching transistor and turning the switching transistor OFF. As this occurs the voltage across the switching transistor increases, so increasing the forward bias of the control transistor base or gate and locking the arrangement in the OFF state even if the overcurrent transient passes.

This form of circuit has the advantage that it does not require any series resistor to be provided in the line of the electrical circuit for determining the existence of an overcurrent, so that the voltage drop across the switching circuit is solely due to the collector-emitter or drain-source voltage drop of the switching transistor. In addition, the absence of a series resistor reduces the number of load current carrying components which allows easier integration of the device.

If the switching circuit has this configuration, the pulse generator is preferably arranged to short the base and emitter or gate and source of the control transistor, thereby turning it OFF which in turn will turn the switching transistor ON. This may be achieved by providing a resetting transistor for "shorting" the base and emitter or gate and source of the control transistor, the base or gate voltage of the resetting transistor being taken from the pulse generator.

Another form of switching circuit may be provided by a transistor switch that controls the circuit current and has a control input, and a control arrangement that controls the voltage of the control input and is responsive to an overcurrent through the switch, the control arrangement comprising a comparator circuit that compares a fraction of the voltage across the switch with a reference voltage and opens the switch if the fraction is greater than the reference voltage.

This arrangement has the advantage that it enables much flatter performance variations with respect to temperature to be obtained. In addition, it is possible to run the circuit protection arrangement according to the invention at considerably higher circuit currents without the danger of it tripping under the normal circuit current. In many cases the arrangement can be operated with up to 80% of the trip current without danger of it tripping.

Preferably the comparator circuit is powered by the voltage drop that occurs across the transistor switch, thereby obviating the need for any separate power supply.

The simplest form of arrangement may comprise a comparator circuit, for example in the form of an open loop operational amplifier, having one input terminal that is connected to a voltage reference and another terminal that samples the voltage difference across the switch by means of a voltage divider. The voltage reference should have a relatively temperature stable performance, preferably having a temperature coefficient of not more than $\pm 0.5\%$ $K^{-1}$, more preferably not more than $\pm 0.2\%$ $K^{-1}$ and especially not more than $0.1\%$ $K^{-1}$. Normally a Zener diode or band gap device will be employed as the voltage regulator.

The pulse length, separation and number will all depend on the application. Typically a pulse of up to 15, and preferably up to 250 ms will be generated, with a pulse separation of 1s to 1 hour. The arrangement will normally incorporate a pulse generator that generates a small number of resetting pulses before stopping, for example up to 10, and especially up to 3 pulses. In many devices it may be desirable for the pulse generator to generate a single pulse only before stopping, so that the protection arrangement can distinguish between a transient in the line and an overcurrent that is due to a fault in the load circuit.

Where the arrangement is intended to be employed with a.c. circuits, the series switching arrangement will be connected to the line via a rectifying bridge circuit. Alternatively a pair of equivalent circuit protection arrangements according to the invention may be employed, the two arrangements handling different cycles of the a.c. signal. This arrangement has the advantage that the voltage drop across the bridge diodes can be removed or reduced.

The overcurrent protection arrangement according to the invention may employ bipolar transistors and/or field effect transistors. Where bipolar transistors are used they are preferably used in a Darlington configuration as the switching transistor in order to reduce the base current required when the transistor is switched ON. This base current must be supplied via a resistor connected between the base and collector of the switching transistor. When the circuit switches to its blocking state the switching transistor base current is diverted through the control transistor (which is now ON) and becomes a leakage current. However, since the voltage drop across the resistor is much higher when the arrangement is in is blocking state, the linkage current is larger than the switching transistor base current. If a Darlington pair or triplet is employed as the switching transistor, the effective d.c. current gain will be increased considerably so that a much higher resistance can be used.

Where field effect transistors are employed, MOSFETS are preferred, especially enhancement mode MOSFETS. The arrangement may be produced as an integrated circuit, in which case the resistors employed in the switching circuit (and in the pulse generator circuit) may be provided by MOSFETs, for example with their gates and drains connected as in NMOS logic. Alternatively, the control transistor and the resistor which together form the voltage divider for the base or gate of the switching transistor may be provided by a complementary n-channel and p-channel pair of FETS connected in the manner of CMOS logic.

If desired the circuit may include a light emitting diode or other means for indicating that the circuit has switched.

Any of a number of means may be used to generate the pulses. Especially where a large number of pulses is intended to be generated, for example they may be generated by an astable oscillator known per se. In order to provide a sufficient time delay between the pulses, it may be appropriate for the pulse generator to include a divider, for example a counter or shift register, whose input is supplied by a relatively fast oscillator, eg. a crystal device or other circuit. Indeed, it may be possible for the user to specify the pulse frequency by selecting the divider output that attempts to reset the switch. The output of the divider will normally be fed to the comparator input via a high pass filter although a monostable oscillator could be used.

The arrangement according to the invention may be formed using discrete components or it may be formed monolithically using well known techniques. Preferably the arrangement is made in monolithic integrated form as such devices are less expensive and are also smaller and more reliable. The use of a divider as described above has the advantage that the value of any capacitors in the pulse generator circuit may be significantly smaller than those that would be required in the absence of the divider, thereby making the circuit more suitable for monolithic integration.

It is preferred for the arrangement to include no resistive components in series with the transistor switch. Such an arrangement not only reduces the voltage drop along the line of the circuit, but, more importantly, reduces the area of silicon that need be employed in an integrated circuit design of the arrangement, thereby reducing the cost.

BRIEF DESCRIPTION OF THE DRAWINGS

Several circuits in accordance with the present invention will now be described by way of example with reference to the accompanying drawings in which:

FIG. 3 is a circuit diagram of a further arrangement according to the invention;

FIG. 4 is a circuit diagram of yet another arrangement according to the invention;

DETAILED DESCRIPTION OF THE DRAWINGS

Figure 1:
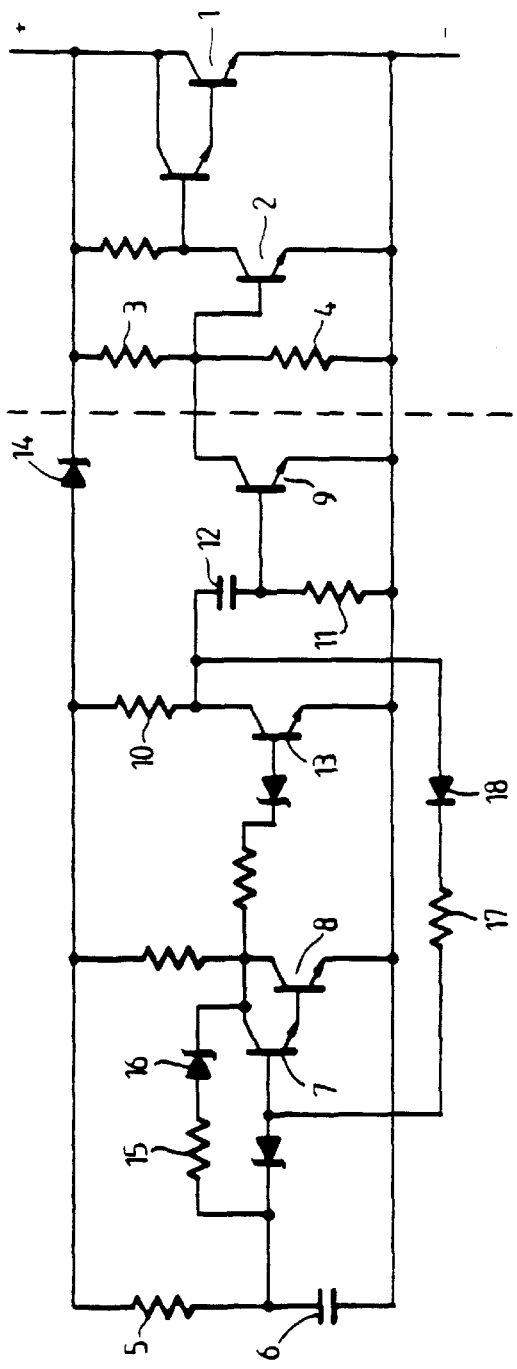
FIG. 1 is a circuit diagram of a first form of protection arrangement according to the invention.

Referring to FIG. 1 of the accompanying drawings, a circuit overcurrent protection arrangement comprises a switching circuit to the right of the broken line, and a pulse generating circuit shown to the left of the broken line. The switching circuit comprises two transistors 1 arranged in a Darlington configuration, forming the switching transistor. The base of the switching transistors is held in a voltage divider formed by a resistor and a control transistor 2, the voltage divider spanning the switching transistors 1, and the base of the control transistor is held in a voltage divider formed by a pair of resistors 3 and 4.

The pulse generator comprises a pulse delay circuit comprising a resistor 5 and capacitor 6 which have a relatively large time constant, in this case about 20 seconds, and which are connected to the base of a pair of transistors 7 and 8 arranged in a Darlington configuration. The collector voltage of transistor 8 is fed into a pulse limiting circuit which comprises a transistor 9 whose base voltage is set by a voltage divider formed by a pair of resistors 10 and 11 and a capacitor 12. A transistor 13 is provided in parallel with capacitor 12 and resistor 11 to drive the base voltage of transistor 9 low when transistor 13 is on.

In operation, under normal currents, the base voltage of transistor 2, which is set by resistors 3 and 4, will maintain its OFF state which causes the Darlington transistors 1 to be ON, and to allow current to flow with a voltage drop of about 1.7 V. If the circuit is subjected to an overcurrent, the base voltage of transistor 2 rises due to increased voltage drop across resistor 4, until transistor 2 turns ON and transistors 1 turn off. The voltage drop across the switching circuit then rises considerably due to the increased resistance of transistors 1, which causes the base emitter voltage of transistor 2 to increase and hold the switching circuit in its OFF state.

When this has occurred, the voltage across the pulse generator will be high enough to overcome the threshold voltage of Zener diode 14, and capacitor 6 will charge. After about 20 seconds the base voltage of transistor 7 will have risen to above 1.2 V and the transistors 7 and 8 will turn on and will turn transistor 13 off. At this point the base voltage of transistor 9 will rise due to the relatively high resistance of resistor 11, transistor 9 will switch on, control transistor 2 will switch OFF and the switching transistor 1 will be forced into its ON state.

If the overcurrent that caused the switching circuit to switch off has disappeared, the voltage drop across the switching circuit, about 1.7 V, will be insufficient to overcome the Zener voltage of the Zener diode 14 with the result that the pulse generating circuit will be isolated and the switch will remain on. If, however, the fault condition persists so that there is a high voltage across the switching circuit, capacitor 12 will charge thereby lowering the base voltage of transistor 9 and switching it off after about 200 ms. This causes control transistor 2 to turn ON and the switching transistors 1 to turn OFF. Because capacitor 12 is charged, and will remain charged, transistor 9, and hence the switching circuit, will remain latched in its OFF state until the supply voltage is removed.

Resistor 15 and Zener diode 16 are provided to ensure that transistor 13 is initially on, to discharge capacitor 12, and to ensure that transistor 9 is OFF. A feedback loop formed from resistor 17 and diode 18 is provided to prevent circuit oscillation by ensuring that transistors 7 and 8 are on when transistor 9 is OFF.

Figure 2:
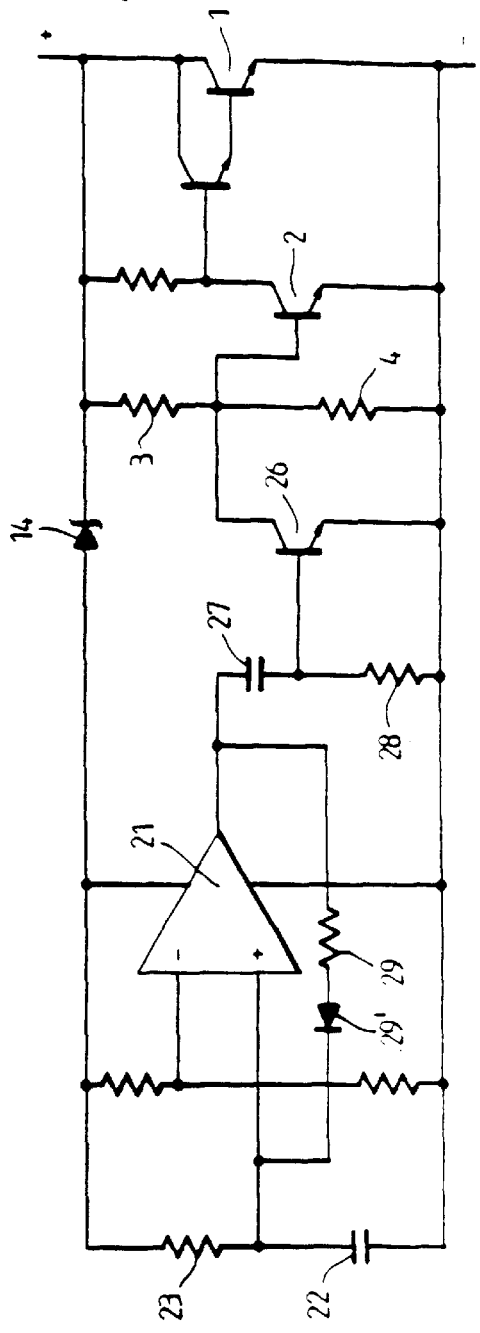
FIG. 2 is a circuit diagram of a second form of arrangement according to the invention.

A second form of overcurrent protection arrangement according to the invention is shown in FIG. 2. This form of arrangement employs a switching circuit comprising transistors 1 and 2 and resistors 3 and 4 which operate as described above with reference to FIG. 1. The arrangement has a pulse generation circuit comprising an operational amplifier 21 that acts as a comparator, comparing the voltage of an RC circuit formed from capacitor 22 and resistor 23 with a reference voltage formed by a voltage divider and turning the switching circuit on accordingly.

In operation, when an overcurrent is experienced and the switching circuit turns off, voltage at the non-inverting input of op amp 21 is lower than the inverting input voltage so that the op amp output is low. As the capacitor 22 charges the non-inverting input voltage rises until, after about 50 seconds, it is higher than the inverting input voltage, whereupon the op amp 21 output goes high and transistor 26 turns ON. This turns control transistor 2 OFF and switching transistors 1 briefly ON. The base voltage of transistor 26 is set by an RC voltage divider formed by capacitor 27 and resistor 28. When the output from the op amp goes high, capacitor 27 charges and reduces the base voltage of transistor 26, thereby turning transistor 26 OFF. This has the effect of turning the switching transistors 1 OFF if the fault is still present. The time constant of the RC base circuit of transistor 26 is approximately 200 ms which will determine the pulse duration.

As described with reference to FIG. 1, if the current transient has disappeared, the voltage drop across the switching circuit will be below the Zener voltage of Zener diode 14 when the control transistors 1 are switched ON and the pulse generating circuit will be isolated. However, if the fault condition persists, capacitors 22 and 27 will remain charged and the switching circuit will remain OFF until the supply is removed.

A feedback loop formed by resistor 29 and diode 29' is provided to prevent the op amp oscillating. Diode 29' prevents the output from the op amp affecting the charging of capacitor 22 when the output is low.

FIG. 3 shows another form of arrangement according to the invention that will attempt to reset itself a finite number of times once it has experienced an overcurrent.

In this arrangement the switching circuit comprising transistors 1 and 2 and resistors 3 and 4 is as described with respect to FIG. 1. The pulse generator is formed from a number of identical stages, two of which are shown as stages A and B, each stage causing one pulse to be generated. Each stage comprises a transistor 131 whose base is connected to the collector of transistor 132 (the corresponding components in different stages being identified by letters "A" and "B"). The base of transistor 132$a,b$ is connected to an RC voltage divider formed from a resistor 133$a,b$ and a capacitor 134$a,b$ via a Zener diode 135$a,b$. The collector of transistor 131$a,b$ of each stage is connected to the base of resetting transistor 136 via a capacitor 137$a,b$ and diode 139$a,b$. In addition, the collector of transistor 131 of each stage other than the last stage is connected to the RC voltage divider formed by resistor 133$b$ and capacitor 134$b$ of the next stage.

In normal operation the pulse generating circuit will be isolated by Zener diode 114. When the arrangement is subjected to an overcurrent, the switching circuit will switch to its blocking state and current will flow into the pulse generating circuit, charging capacitors 134 and 139. When the voltage across the capacitor 134$a$ rises above the breakdown voltage of Zener diode 135$a$ transistor 132$a$ will turn ON slowly, causing transistor 131$a$ to turn OFF quickly. The sudden rise in the collector voltage of transistor 131$a$ causes resetting transistor 136 briefly to turn ON thereby "shorting" the base-emitter junctions of control transistor 2 and switching transistors 1 ON. Transistor 136 will then turn OFF once capacitor 137$a$ has charged up. If the fault condition has ended the transistors 1 will remain permanently ON. If, however, the fault condition persists capacitor 134$b$ of the second stage will charge up until the voltage across it is greater than the breakdown voltage of diode 135$b$. The second stage then operates in the same manner as the first stage so that transistor 131$b$ will be turned OFF and the supply voltage will be dropped across resistor 138, turning transistors 136 and 1 ON. As before, if the fault condition has ended the transistors 1 will remain ON, but if it persists, capacitor 137b will charge up, turning transistors 136 and 1 OFF permanently.

Capacitor 139 is included to stabilize the supply to the circuit since the supply to the circuit from the line will be lost briefly when transistors 1 are turned ON to check if the fault has disappeared.

It is possible to alter the number of times the arrangement attempts to reset itself simply by altering the number of stages (shown as A and B) in the arrangement.

FIG. 4 shows yet another form of arrangement according to the invention that will attempt to reset itself a finite number of times once it has experienced an overcurrent.

This arrangement comprises an overcurrent protection circuit that includes an astable oscillator 30 to cause the circuit to attempt to reset itself indefinitely. The spacing between pulses generated by the astable oscillator 30 and the duration of the pulses are set by the time constants of the RC circuits formed by capacitor 32 and resistor 33, and by capacitor 34 and resistor 35 respectively. The arrangement also includes a pair of transistors 42 and 43 that are controlled by an RC potential divider formed by resistor 44 and capacitor 45. The collector of transistor 43 is connected to the base of a further transistor 46 which is connected across the base emitter terminals of the resetting transistor 47 (corresponding to transistor 31 of FIG. 3).

In operation, when an overcurrent is experienced the circuit will switch OFF and then continually attempt to reset itself periodically by virtue of the astable oscillator. In addition the voltage across the circuit causes capacitor 45 to charge up. When the capacitor voltage is greater than the Zener voltage of Zener diode 48 transistor 42 begins to turn ON slowly whereupon transistor 43 is turned OFF quickly. This causes transistor 46 to turn ON and "short" the base-emitter terminals of the resetting transistor 47, thereby turning the switching circuit OFF permanently.

Thus, the number of times the circuit attempts to reset itself (N) is given by:

$$N = \frac{\text{Time interval defined by } RC \text{ circuit 44 and 45}}{\text{Interval between reset pulses from the astable oscillator}}$$

N is readily varied by changing the value of capacitor 45. In integrated form, the autoresettable device could be manufactured to be application specific; the number of attempts to reset, being dependent on the area of the capacitor contact, would be left uncommitted until the final contact mask in the fabrication process is employed. This allows the bulk of the manufacturing process to be standardized, regardless of application, whilst also enabling fine timing of the device during the final stages of fabrication to meet specific protection requirements.

Figure 5:
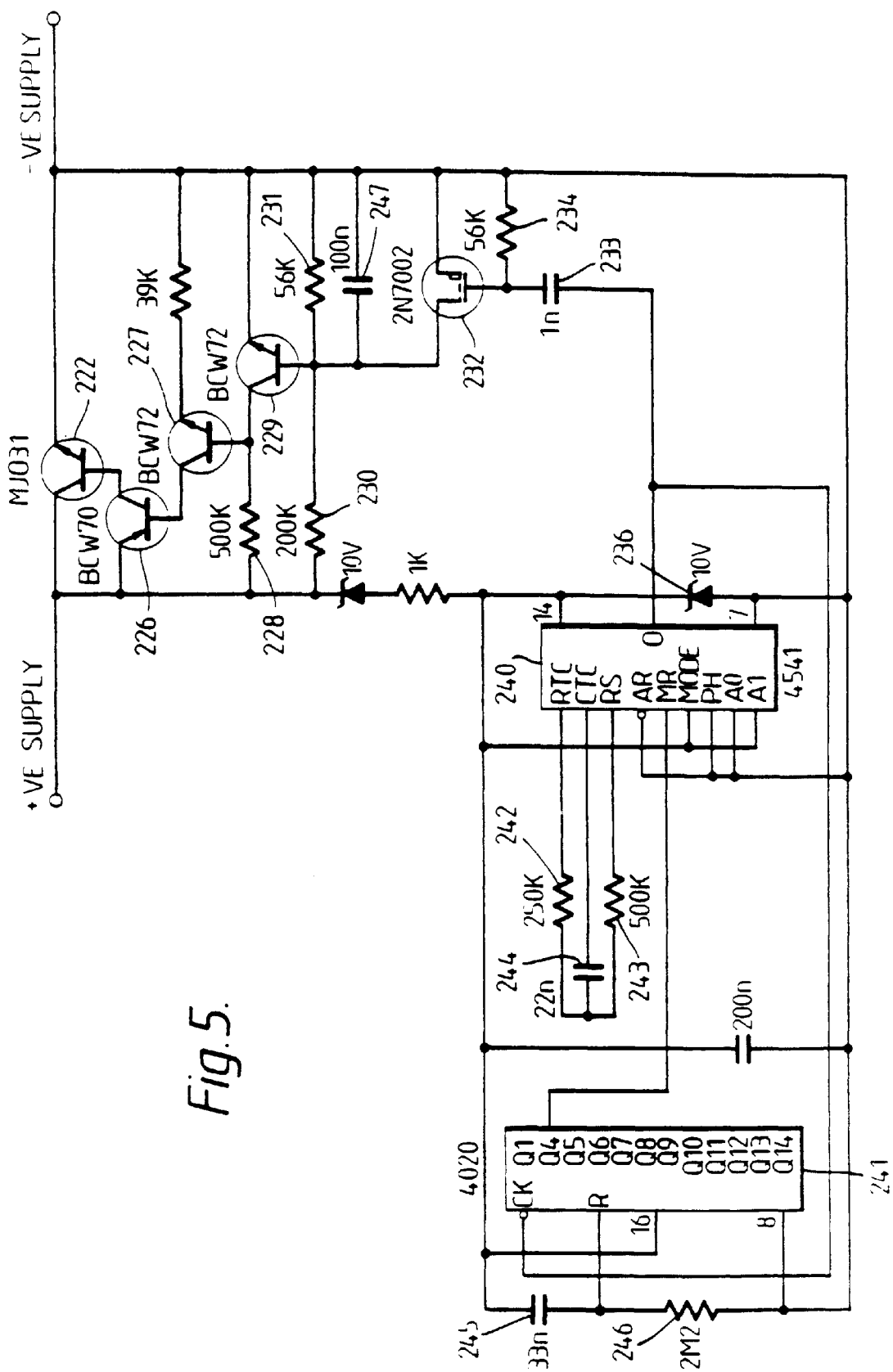
FIG. 5 is a circuit diagram of yet another arrangement according to the invention

A further arrangement of a protection circuit according to the invention is shown in FIG. 5. The protection circuit comprises a pass transistor 222 that is driven by two transistors 226 and 227 that form a complementary Darlington pair. The base of transistor 227 is connected to a voltage divider that spans the pass transistor 222 and comprises a resistor 228 and a control transistor 229, and the base of the control transistor 229 is held in a voltage divider which also spans the pass transistor and is formed from resistors 230 and 231. A resetting FET 232 is connected across the resistor 231 between the base and emitter of the control transistor 229.

A resetting circuit comprises a 4541 programmable timer 240 and a counter 241. The timer 240 is connected so as to generate a pulse about once every 20 seconds and the pulse is fed into the gate of the resetting transistor 232 via a high pass RC filter formed by capacitor 233 and resistor 234. The pulse is also fed into the clock input of the counter 241 and one of the outputs of the counter, in this case the 04 output, is fed back into the master reset pin of the timer 240. Both the timer 240 and the clock 241 are powered by the voltage appearing across the pass transistor clipped to 10 V by Zener diode 236.

When an overcurrent is experienced the voltage across the pass transistor 22 increases until the base emitter voltage of control transistor 229 is sufficient to turn it on. This effectively shorts the base-emitter junction of transistor 227 and turns transistors 222, 226 and 227 OFF.

Since the pass transistor 222 has been turned off, substantially the entire voltage drop occurs across the protection circuit, thereby powering timer 240 and counter 241. The timer 240 is programmed by resistors 242 and 243 and capacitor 244 to generate pulses about every 20 seconds which are sent to the gate of the resetting transistor 232. Whenever the resetting transistor 232 receives a pulse it turns on and "shorts" the base-emitter junction of the control transistor 229, thereby turning it off and turning the pass transistor on. If the fault still exists, the pass transistor will turn off again as soon as capacitor 233 has charged up enough.

This process occurs each time timer 240 generates a pulse. However, each timer pulse is fed into the clock input of counter 241, and once eight pulses have been generated by the timer 240 the counter output goes high and disables the timer 240. If the overcurrent has not cleared by this stage the protection circuit will continue to block current in the line until the power is switched off.

An R C voltage divider formed by resistor 246 and the capacitor 245 sends a pulse to the reset pin of the counter 241 to reset the counter on power-up. In addition, a 100 nF capacitor 247 is connected across the resistor 231 and the base emitter junction of the control transistor 229 in order to disable switching for a short time on switch-on in case the load is capacitative.

What is claimed is:

1. An overcurrent protection arrangement which comprises a switching circuit which
   (a) is intended to be series connected in a line of a circuit to be protected,
   (b) has a conducting state in which it will allow normal circuit currents to pass,
   (c) has an open state which it adopts when subjected to an overcurrent, and
   (d) comprises a switching transistor that is intended to be series connected in the line of the circuit, and a control transistor that determines a base or gate voltage of the switching transistor, the switching transistor, the control transistor, or the switching transistor and the control transistor comprising an enhancement mode MOSFET, the arrangement including a pulse generator which takes power from a voltage difference across the switching circuit and which, when the switching circuit is in the open state, will generate one or more pulses, up to a predetermined finite maximum number of pulses, or for a predetermined time, which will reset the switching circuit to the conducting state if the switching circuit is no longer subjected to an overcurrent.

2. An overcurrent protection arrangement which comprises a switching circuit which (a) is intended to be series connected in a line of a circuit to be protected, (b) has a conducting state in which it will allow normal circuit currents to pass, (c) has an open state which it adopts when subjected to an overcurrent, and (d) comprises a switching transistor that is intended to be series connected in the line of the circuit, and a comparator circuit that compares a voltage across the switch with a reference voltage and opens the switch if the voltage across the switch is greater than the reference voltage, the arrangement including a pulse generator which takes power from a voltage difference across the switching circuit and which, when the switching circuit is in the open state, will generate one or more pulses, up to a predetermined finite maximum number of pulses, or for a predetermined time, which will reset the switching circuit to the conducting state if the switching circuit is no longer subjected to an overcurrent.

3. An overcurrent protection arrangement which comprises a switching circuit which (a) is intended to be series connected in a line of a circuit to be protected, (b) has a conducting state in which it will allow normal circuit currents to pass, (c) has an open state which it adopts when subjected to an overcurrent, and (d) comprises a switching transistor that is intended to be series connected in the line of the circuit, and a control transistor that determines a base or gate voltage of the switching transistor the arrangement including a pulse generator which takes power from a voltage difference across the switching circuit and which, when the switching circuit is in the open state, will generate one or more pulses, up to a predetermined finite maximum number of pulses, or for a predetermined time, which will reset the switching circuit to the conducting state if the switching circuit is no longer subjected to an overcurrent, and the arrangement including no resistive components in series with the switching transistor so that any voltage drop across the switching circuit is solely due to the collector-emitter or drain-source voltage drop of the switching transistor.

4. An overcurrent protection arrangement which comprises a switching circuit which is (a) intended to be series connected in a line of a circuit to be protected, (b) has a conducting state in which it will allow normal circuit currents to pass, and (c) has an open state which it adopts when subjected to an overcurrent, the arrangement including a pulse generator which takes power from a voltage difference across the switching circuit and which, when the switching circuit is in the open state, will generate a single pulse only which will reset the switching circuit to the conducting state if the switching circuit is no longer subjected to an overcurrent.

5. An overcurrent protection arrangement which comprises a switching circuit which is (a) intended to be series connected in a line of a circuit to be protected, (b) has a conducting state in which it will allow normal circuit currents to pass, and (c) has an open state which it adopts when subjected to an overcurrent, the arrangement including a pulse generator which takes power from a voltage difference across the switching circuit and which, when the switching circuit is in the open state, will generate one or more pulses, up to a predetermined finite maximum number of pulses, or for a predetermined time, which will reset the switching circuit to the conducting state if the switching circuit is no longer subjected to an overcurrent, each pulse generated by the pulse generator having a length of not more than 250 ms.

* * * * *